United States Patent [19]

Barker et al.

[11] Patent Number: 5,643,695
[45] Date of Patent: Jul. 1, 1997

[54] CARBONACEOUS ELECTRODE AND COMPATIBLE ELECTROLYTE

[75] Inventors: Jeremy Barker; Feng Gao, both of Henderson, Nev.

[73] Assignee: Valence Technology, Inc., Henderson, Nev.

[21] Appl. No.: 630,402

[22] Filed: Apr. 10, 1996

Related U.S. Application Data

[63] Continuation-in-part of Ser. No. 533,882, Sep. 26, 1995.
[51] Int. Cl.$^6$ .................................................. H01M 10/40
[52] U.S. Cl. ........................... 429/197; 429/217; 429/218
[58] Field of Search ......................... 429/194, 196, 429/197, 223, 224, 218; 423/448

[56] References Cited

U.S. PATENT DOCUMENTS

| | | |
|---|---|---|
| 4,517,265 | 5/1985 | Bélanger et al. . |
| 4,668,595 | 5/1987 | Yoshino et al. . |
| 4,725,422 | 2/1988 | Miyabayashi et al. . |
| 4,945,014 | 7/1990 | Miyabayashi et al. . |
| 4,959,281 | 9/1990 | Nishi et al. . |
| 5,028,500 | 7/1991 | Fong et al. . |
| 5,130,211 | 7/1992 | Wilkinson et al. . |
| 5,176,969 | 1/1993 | Miyabayashi et al. . |
| 5,187,035 | 2/1993 | Miyabayashi et al. . |
| 5,192,629 | 3/1993 | Guyomard et al. . |
| 5,310,553 | 5/1994 | Simon et al. ................. 429/194 X |
| 5,326,658 | 7/1994 | Takahashi et al. . |
| 5,352,548 | 10/1994 | Fujimoto et al. . |

OTHER PUBLICATIONS

A.N. Dey abd B.P. Sullivan, "The Electrochemical Decomposition of Propylene Carbonate on Graphite", J. Electrochem. Soc., vol. 117, No. 2, 222–224, Feb. 1970.

J.R. Dahn, A.K. Sleigh, H. Shi, J.N. Reimers, Q. Zhong, and B.M. Way, "Dependence of the Electrochemical Intercalation of Lithium in Carbons on the Crystal Structure of the Carbons", Electrochimica Acta, vol. 38, No. 9, 1179–1191, 1993 (Month not Available).

Z.X. Shu, R.S. McMillan, and J.J. Murray, "Electrochemical Intercalation of Lithium into Graphite", J. Electrochem. Soc., vol. 140, No. 4, 922–927, Apr. 1993.

J. Barker, "Three Electrode Electrochemical Voltage Spectroscopy (TEVS): Evaluation of a Model Lithium Ion System", Electrochimica Acta, vol. 40, No. 11, 1603–1608, 1992 (Month not Available).

A. Mabuchi, K. Tokumitsu, H. Fujimoto, and T. Kasuh, "Charge-Discharge Characteristics of the Mesocarbon Microbeads heat–Treated at Different Temperatures", J. Electrochem. Soc., vol. 142, No. 4, 1041–1046, Apr. 1995.

A. Mabuchi, H. Fujimoto, K. Tokumitsu, and T. Kasuh, "Charge-Discharge Mechanism of Graphitized Mesocarbon Microbeads", J. Electrochem. Soc., vol. 142, No. 9, 3049–3051, Sep. 1995.

(List continued on next page.)

*Primary Examiner*—Anthony Skapars
*Attorney, Agent, or Firm*—Linda Deschere

[57] ABSTRACT

The inventions provides a battery which comprises a first electrode, a counter electrode which forms an electrochemical couple with said first electrode, and an electrolyte. The first electrode comprises graphite particles having an interlayer distance spacing of 002 planes ($d_{002}$) as determined by x-ray diffraction of 0.330 to 0.340 nanometers (nm), a crystallite size in the direction of c-axis ($L_c$) being greater than about 90 nanometers (nm) and less than about 1000 nanometers, and at least 90 percent by weight of said graphite particles having a size less than about 24 microns ($\mu$m). The electrolyte comprises a solvent mixture and a solute; the solvent mixture comprises (i) ethylene carbonate (EC), and (ii) a solvent selected from the group consisting of propylene carbonate (PC), butylene carbonate (BC), and mixtures thereof with the ethylene carbonate being present in an amount by weight which is at least as great as the amount of any other solvent. Optionally, the solvent mixture further comprises one or more other organic solvents selected from the group consisting of methyl ethyl carbonate (MEC), diethyl carbonate (DEC), dipropyl carbonate (DPC), dimethyl carbonate (DMC), and mixtures thereof.

30 Claims, 3 Drawing Sheets

OTHER PUBLICATIONS

Z.X. Shu, R.S. McMillan, J.J. Murray, and I.J. Davidson, "Use of Chloroethylene Carbonate as an Electrolyte Solvent for a Lithium Ion Battery Containing a Graphitic Anode", J. Electrochem. Soc., vol. 142, No. 9, L161–L162, Sep. 1995.

T.D. Tran, J.H. Feikert, X. Song, and K. Kinoshita, "Commercial Carbonaceous Materials as Lithium Intercalation Anodes", J. Electrochem. Soc., vol. 142, No. 10, 3297–3302, Oct. 1995.

Product Brochure "Graphite for batteries", Lonza G&T, Ltd., (Sins, Switzerland) (Date not Available).

Technical Documentation for "Graphite KS 6", Lonza G&T, Ltd., (Sins, Switzerland), Apr. 1993.

Technical Documentation for "Graphite SFG 44", Lonza G&T, Ltd., (Sins, Switzerland), Apr. 1993.

Technical Documentation for "Graphite SFG 15", Lonza G&T, Ltd., (Sins, Switzerland), Apr. 1993.

Technical Documentation for "Graphite KS 15", Lonza G&T, Ltd., (Sins, Switzerland), Apr. 1993.

Technical Documentation for "Graphite KS 44", Lonza G&T, Ltd., (Sins, Switzerland), Apr. 1993.

CARBONACEOUS ELECTRODE AND COMPATIBLE ELECTROLYTE

CROSS-REFERENCE TO RELATED APPLICATION

This application is a continuation-in-part of co-pending U.S. application Ser. No. 08/533,882 filed Sep. 26, 1995.

FIELD OF THE INVENTION

This invention relates to electrochemical cells and batteries, and more particularly, to improved electrodes for such batteries.

BACKGROUND OF THE INVENTION

Lithium batteries are prepared from one or more lithium electrochemical cells. Such cells typically include an anode (negative electrode) of metallic lithium, a cathode (positive electrode) typically a transition metal chalcogenide and an electrolyte interposed between electrically insulated, spaced apart positive and negative electrodes. The electrolyte typically comprises a salt of lithium dissolved in one or more solvents, typically nonaqueous (aprotic) organic solvents. By convention, during discharge of the cell, the negative electrode of the cell is defined as the anode. During use of the cell, lithium ions (Li+) are transferred to the negative electrode on charging. During discharge, lithium ions (Li+) are transferred from the negative electrode (anode) to the positive electrode (cathode). Upon subsequent charge and discharge, the lithium ions (Li+) are transported between the electrodes. Cells having metallic lithium anode and metal chalcogenide cathode are charged in an initial condition. During discharge, lithium ions from the metallic anode pass through the liquid electrolyte to the electrochemically active material of the cathode whereupon electrical energy is released. During charging, the flow of lithium ions is reversed and they are transferred from the positive electrode active material through the ion conducting electrolyte and then back to the lithium negative electrode.

Lithium batteries, with metallic lithium electrodes, have a limited life cycle due to the degradation of the metallic lithium electrodes. Lithium is attacked and/or passivated by electrolytes. This results in formation of lithium powder with a very high surface area at the interface between the metallic lithium and the electrolyte. The formation of high surface area lithium powder is undesirable because it reacts violently with moisture and air.

It has recently been suggested to replace the lithium metal anode with a carbon anode, that is, a carbonaceous material, such as non-graphitic amorphous coke, graphitic carbon, or graphites, which are intercalation compounds. This presents a relatively advantageous and safer approach to rechargeable lithium as it replaces lithium metal with a material capable of reversibly intercalating lithium ions, thereby providing the sole called "rocking chair" battery in which lithium ions "rock" between the intercalation electrodes during the charging/discharging/recharging cycles. Such lithium metal free cells may thus be viewed as comprising two lithium ion intercalating (absorbing) electrode "sponges" separated by a lithium ion conducting electrolyte usually comprising a lithium salt dissolved in nonaqueous solvent or a mixture of such solvents. Numerous such electrolytes, salts, and solvents are known in the art. Such carbon anodes may be prelithiated prior to assembly within the cell having the cathode intercalation material. However, such preintercalation may present problems as it is known that prelithiated carbon electrodes are highly reactive. Such carbon anodes are preferably lithiated in situ. In one embodiment, such prelithiation occurs against a metallic lithium electrode which is later replaced with the cathodic active material electrode of the final cell. In another embodiment, the carbon-based negative electrode is assembled with lithium-containing cathode and/or lithium-containing electrolyte which provides the necessary lithium to form an $Li_xC$ anode in situ. In such a case, in an initial condition, such cells are not charged. In order to be used to deliver electrochemical energy, such cells must be charged in order to transfer lithium to the carbon from the lithium-containing cathode and/or electrolyte. During discharge, the lithium is transferred from the anode back to the cathode as described above.

One drawback of the carbon anode is that upon initial charging of the cell, when lithium is intercalated into the host carbon, some irreversibility occurs in which lithium and/or the cell electrolyte are consumed, resulting in an initial capacity loss for the cell and a reduction of the cell's overall performance. For example, when the anode material $Li_xC$ is prepared in situ in a cell in order to obtain a state of charge and render the anode to a reduced state, some of the lithium which is transferred to the anode upon initial charging, is irretrievably intercalated into the anode in an irreversible process. Some of the intercalated lithium is, therefore, not deintercalated from the anode during subsequent discharge resulting in the loss of capacity since lithium is not available for electrochemical interaction to produce electrical energy. The progressive loss of capacity during use is referred to as "capacity fade".

Based upon the short comings of such carbon-based cells there remains a need for electrochemical cells that are capable of providing improved performance. Therefore, what is needed is an improved anode material which is an alternative to present metallic lithium anodes and a compatible electrolyte which simultaneously fulfills the requirement of high reactivity, good charge rate capabilities, acceptable life cycle, specific rate, stability, and low cost. There is also needed an improved electrochemical cell which does not suffer the initial loss of cycling capability and the further progressive loss known as capacity fade during use.

SUMMARY OF THE INVENTION

The present invention provides an electrochemical cell or battery which has a non-metal negative electrode (anode). The battery comprises a negative electrode having an active material consisting of graphite particles having an interlayer distance spacing of 002 planes (c/2, $d_{002}$) as determined by x-ray diffraction of 0.330 to 0.340 nanometers (nm), preferably 0.3350 to 0.3360 nanometers, and most preferably 0.3355 nanometers. The graphite particles have a crystallite size in the direction of the c-axis ($L_c$) being greater than about 90 nanometers, up to about 1000 nanometers; preferably greater than 90 nanometers and less than 200 nanometers, and most desirably greater than 100 nanometers and less than 200 nanometers. The parameter $L_c$ is a well known parameter defining the size of crystalline domains to characterize at least partially graphitized (ordered) carbon, and in this case, graphite. Graphite is made up of carbon layers of approximate dimension $L_a$ in the a-b plane and $L_c$ in the c-axis direction as defined above which designate the regions which scatter coherently within themselves x-rays. As used herein, the designation $L_c$ refers to the direction in the c-axis of the size of a region which scatter x-rays coherently, similarly, $L_a$ refers to the a-b plane. Accordingly, each ordered, crystalline, carbon grain is made up of many small regions, each characterized by $L_a$ and $L_c$, which scatter x-rays incoherently with respect to one another, that is, region to region.

The graphite particles of the invention are further characterized by 90 percent by weight of such particles having a size less than about 48 microns, desirably less than about 24 microns, and preferably 90 percent by weight of the graphite particles have a size less than about 16 microns. Most preferably, the graphite particles are characterized by a median size ($d_{50}$) of at least about 3 microns and less than or equal to about 22 microns.

Most preferably, the graphite particle size distribution is such that essentially all of the graphite particles have a size less than about 48 microns, 94 percent of the particles are less than 16 microns, and the median size is about 8.1 microns. Such particles are designated as SFG-15 further described below. Another type of suitable particles have particle size distribution where essentially all of the graphite particles are less than 32 microns, and more preferably at least 95 percent of the particles are less than 12 microns, and where the median size is 5.8 microns. Such particles are designated as SFG-10 and further described hereinbelow. Still another group of preferred graphite particles has a graphite size distribution wherein essentially all of the particles have particle size less than about 12 microns, at least about 96 percent of the particles have a size less than about 6 microns, and the median size of the graphite particles is about 3.2 microns. Such particles are designated as SFG-6 and further described hereinbelow. The specific surface area of the graphite particles, as determined by the Brunauer-Emmett-Teller (BET) method is preferably greater than about 4 square meters per gram and up to about 16 square meters per gram, and preferably greater than about 6 and up to about 12 square meters per gram.

The electrolyte usable with the specific carbons of the invention is a mixture of solvents. In one embodiment, the mixture of solvents comprises: (i) ethylene carbonate; and (ii) a solvent selected from the group consisting of propylene carbonate (PC), butylene carbonate (BC), and mixtures of PC and BC. It is preferred that the EC is present in an amount by weight which is at least as great as the amount of the selected solvent, namely, the PC, the BC, or the mixture of PC and BC. In another embodiment, the mixture of solvents comprises propylene carbonate and ethylene carbonate, with the ethylene carbonate being present in an amount by weight which is at least as great as the amount of the propylene carbonate. Desirably, the solvent mixture comprises EC and PC in a weight ratio of 50EC:50PC to 75EC:25PC. Alternatively, the mixture desirably comprises 50EC:50BC. If desired, one or more additional organic solvents may be included in the solvent mixture. Such other organic solvents are selected from the group consisting of methyl ethyl carbonate (MEC), diethyl carbonate (DEC), dipropyl carbonate (DPC), dimethyl carbonate (DMC), and mixtures thereof. A preferred solvent mixture includes EC, PC and DMC where the EC is present in an amount not less than the amount by weight of the DMC and as stated earlier the EC is present is an amount by weight not less than of the PC. Accordingly, such solvent mixture preferably comprises the weight ratio of ⅓EC:⅓PC:⅓DMC and up to 50EC:25PC:25DMC. This corresponds to 1EC:1PC:1DMC to 2EC:1PC:1DMC. In still another desirable embodiment, the solvent mixture comprises 1EC:1PC:1BC to 2EC:1PC:1BC. Regardless of the nature of the one or more additional organic solvents besides EC and PC, the one or more other organic solvents preferably have a boiling point less than the boiling point of EC due to its tendency to solidify at ambient temperatures. As can be seen, it is desirable that the amount by weight of EC be at least as great as any other single solvent component, as exemplified by ⅓EC:⅓PC:⅓DMC and 50EC:25PC:25DMC. It is preferred that the EC be the largest single component of the solvent mixture, as exemplified by 75EC:25PC and 50EC:25PC:25DMC. In other words, EC preferably constitutes a major portion of the solvent mixture by weight, or is at least as great as any other single component.

In preparing a battery constituting the negative electrode described above and the electrolyte, essentially any counter electrode may be selected so long as it is capable of reacting electrochemically with the graphite negative electrode material. Preferred are lithium transition metal oxide compounds. The negative electrode and positive electrode are assembled in a battery with an electrolyte which provides ionic conductivity between the positive and negative electrode. Typically and preferably, the electrolyte is in the form of an electrolyte separator which further comprises a solid matrix forming a network with voids interpenetrated by the solvent mixture, and a solute. Essentially any type of electrolyte separator arrangement may be selected so long as the solvent consists of the preferred organic solvents mentioned above. In one embodiment, the electrolyte separator has a solid matrix which is a polymeric acrylate formed from acrylate precursors which are applied to a surface of the cathode or anode and then polymerized to form an electrolyte/electrode composite. In another embodiment the matrix is a porous polypropylene or polyethylene sheet or a sheet of fiber glass material placed between the anode and cathode. The nature of the electrolyte separator is not critical so long as it is used with the solvent mixture of the invention along with the stated graphite negative electrode defined by the invention.

Objects, features, and advantages of the invention include an improved electrochemical cell or battery based on alkali metal, and preferably lithium, which has improved charging and discharging characteristics; a large discharge capacity; and which maintains its integrity over a prolonged life cycle as compared to presently used anodes. Another object is to provide an electrolyte mixture which is stable with respect to the graphite negative electrode, which demonstrates high performance, and which does not readily decompose or evaporate. Still another object is to provide an anode active material which is an alternative to metallic alkali anodes, lithium, sodium, potassium, and particularly lithium anodes. It is also an object of the present invention to provide cells which can be manufactured more economically and relatively more conveniently and safely than present carbon-based and lithium anodes. And to provide cells with carbon-based anodes that are compatible with electrolytes which avoid problems with undesired reactivity.

These and other objects, features, and advantages will become apparent from the following description of the preferred embodiments, claims, and accompanying drawings.

DETAILED DESCRIPTION OF THE PREFERRED EMBODIMENTS

Figure 1:
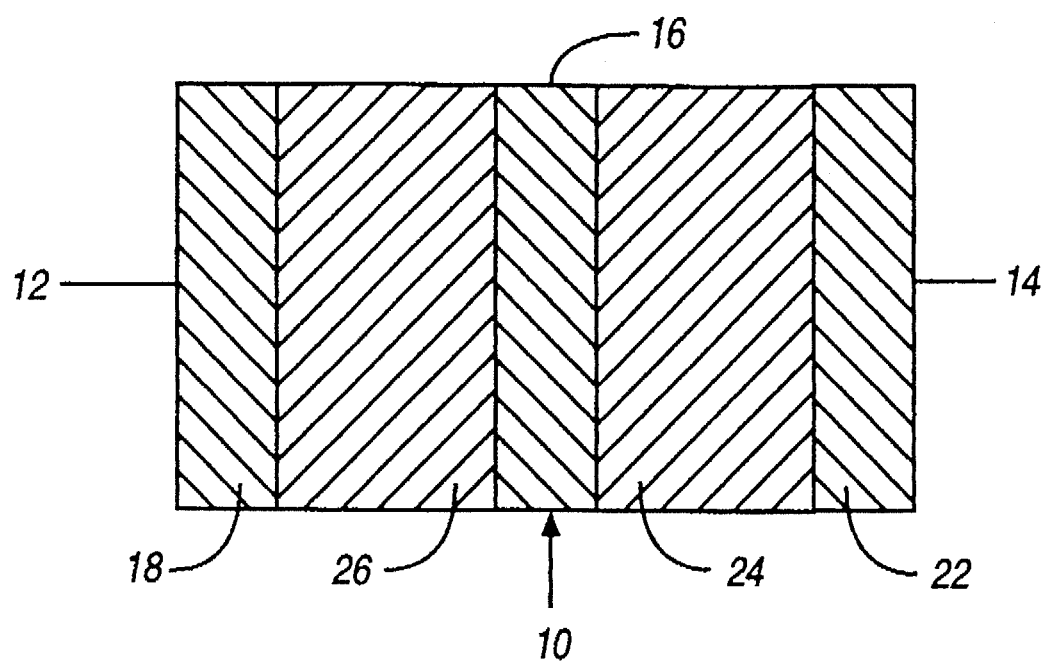
FIG. 1 is an illustration of a cross section of a thin battery or cell embodying the invention.

The present invention provides an electrochemical cell or battery, which has a non-metal negative electrode (anode). That is, no solid metal active material is used in the cell. Rather than the conventional solid lithium metal anode, the active material of the new anode comprises a specific type of carbon powder having unique operating advantages when used in combination with a specifically selected compatible electrolyte.

Before describing the invention, it is useful to understand the problems associated with present carbon anode batteries which deter their use.

Generally, the carbonaceous materials (carbons) known to be usable as intercalation carbon anode materials may, for discussion purposes, be classified in several distinct groups. One group contains highly structured, highly crystalline, highly graphitic, anisotropic graphites having a nearly perfect layered structure and preferably formed as synthetic graphites and heat treated up to about 3000° C. Examples are the SFG series of synthetic graphites and the KS series of synthetic graphites as supplied by the manufacturer Lonza G. & T., Limited (Sins, Switzerland). A second distinct group contains graphitic carbons which have relatively very large crystal size (L$_c$ greater than 2000) and are fully graphitized, typically, graphitized cokes, such as, supplied under the name Super SG and BG by Superior Graphite Corporation (USA). A third class of carbons are non-graphitic carbons. These are considered amorphous, non-crystalline, disordered, and are generally petroleum cokes and carbon blacks, such as, supplied by Lonza under the designation FC-250 and Conoco (USA) under the designation X-30. They have a turbostratic structure, show a steep voltage profile and intercalate only up to 0.5 Li per C$_6$ (Li$_{0.5}$C$_6$, LiC$_{12}$).

Lithiated petroleum coke (Li$_x$C$_{12}$) is usable in combination with a variety of electrolytes without excessive deterioration of the electrolyte solvent. However, the performance of such lithiated petroleum cokes is relatively poor due to sloping voltage profile and limited intercalation capacity.

Graphite has a higher lithium intercalation/deintercalation capacity, theoretically about LiC$_6$. It has double the intercalation capacity, and a flat voltage curve near zero volts relative to lithium. The theoretical capacity of a graphite anode is 372 mAh/g based upon a stoichiometry of LiC$_6$. Despite these theoretical advantages, graphites have not found favor for use in lithium batteries. This is because the use of graphite as a negative electrode material presents a problem when graphite is used with a preferred propylene carbonate electrolyte solvent. Cells containing graphite and propylene carbonate and other similar electrolytes suffer from very poor reversible capability during delithiation (deintercalation). In addition, electrolyte decomposition occurs, and significant gas is released, posing a safety risk. The electrolyte decomposition is thought to be because graphite has many active sites in its structure as compared with graphitic carbon (having large crystallized size L$_c$ greater than 1,000 to 2,000), and as compared to cokes which are amorphous.

It has been found that if a graphite negative electrode is used in an electrolyte containing propylene carbonate as the solvent, the solvent is apparently absorbed into the active sites of the graphite negative electrode and readily generates gas through decomposition. As a result, the decomposition of the solvent prevents lithium ion as an active material from intercalating into the graphite on charging the battery and causes an increase in polarization; consequently, the battery capacity is decreased. In other words, it is thought that the graphite is catalytic and causes breakdown of propylene carbonate. Such decomposition of the propylene carbonate results in the evolution of the gas, probably propylene.

In view of the difficulties mentioned above, namely, that propylene carbonate is usable only with non-graphitic anodes and is not usable with crystalline, ordered planar structure graphitic anodes. It has recently been suggested to use dimethyl carbonate (DMC) in combination with ethylene carbonate (EC) for any type of carbonaceous anode. See for example U.S. Pat. Nos. 5,352,548 and 5,192,629, each of which is incorporated by reference in its entirety. Moreover, such electrolyte is undesirable since the DMC readily evaporates leaving behind the EC which quickly solidifies, rendering the cell useless.

Except for the present invention, there is not known to be a successful use of a propylene carbonate based electrolyte solvent in combination with graphite anode active material.

The invention provides, for the first time, a specific type of graphite negative electrode active material which is successfully used in combination with a solvent comprising propylene carbonate, which maintains a high reversible specific capacity, and demonstrates minimal first cycle capacity loss, heretofore unexpected and surprising in view of difficulties posed by graphite anodes operating in the presence of propylene carbonate.

The present invention provides an electrochemical cell or battery which has a heretofore unexpected first cycle capacity loss of less than about 25 percent of the first cycle charge capacity and which is characterized by a negative electrode having a reversible capacity of greater than about 330 milliamp hours per gram (mAh/g). Advantageously, the cells of the invention having the specific graphite of the invention demonstrates reversible specific capacity of 339 to 351 milliamp hours per gram (mAh/g) and a first cycle capacity loss in a range of 18 to 22 percent. Specific graphites exhibiting this type of behavior are as exemplified by graphitic material sold under the designation SFG by Lonza G. & T., Limited (Sins, Switzerland). Specifically, the graphites are designated as SFG-6™, SFG-10™, and SFG-15™. Each of these graphites has an ash content of 0.15 percent by weight maximum, a moisture content of 0.5 percent by weight maximum, and an interlayer distance of 0.3354 to 0.3358. Each of these graphites is also characterized by a crystallite size L$_c$ of greater than 90 and less than 1000 nanometers. Each of these graphites is also characterized by a density determined by the Xylene method of 2.26 grams per cubic centimeter and by the Scott method 0.07 to 0.09 grams per cubic centimeter. The features of the specific graphites are included in Table I along with comparative data for other graphites tested. Further characteristics for the three specific graphites of the invention will now be described, and are shown in Tables II and III.

The preferred SFG-6 and 10 have many values the same as that for SFG-15 in Table II. The desirable SFG-6 and 10 have the same ash content, moisture content, interlayer distance, purity, and $d_{002}$ as are shown in Table II for SFG-15. The SFG-6, 10, and 15 series differ in particle size, crystalline size ($L_c$), BET area, and density according to the Scott method. The undesirable graphite SFG-44 has very different particle size, crystalline size ($L_c$), BET area, and density according to the Scott method.

SFG-6™ has a crystalline size $L_c$ greater than 100 nanometers, a BET surface area of 15.2 square meters per gram, and a particle size distribution wherein essentially 100 percent by weight of the particles have a size less than 12 microns, 97 percent by weight less than 8 microns, 95.8 percent by weight less than 6 microns, and a median particle size of 3.2 microns. The density in Xylene is as per SFG-15, but density by the Scott method for SFG-6 is 0.07 grams per cubic centimeter. (Table III.)

SFG-10™ has a crystalline size $L_c$ greater than 150 nanometers, a BET surface area of 11.1 square meters per gram, and a particle size distribution based on percent by weight as follows: essentially 100 percent less than 32 microns, 94.9 percent less than 12 microns, 75 percent less than 8 microns, and a median particle size of 5.8 microns. (Table III.) The density is the same as that stated for SFG-6, in Xylene and per Scott.

SFG-15™ has a crystalline size $L_c$ greater than 120 nanometers, a BET surface area of about 8.8 square meters per gram, and a particle size distribution where essentially 100 percent of the particles have a size less than 48 microns, 99 percent of the particles have a size less than 24 microns, 94 percent of the particles have a size less than 16 microns, and a median particle size of 8.1 microns.

Each of the three graphites of the invention, SFG-6, 10, and 15 have an interlayer distance spacing of 002 planes of preferably 0.3355. This interlayer distance spacing is designated in the literature as c/2 or $d_{002}$. Each of the above graphites is anisotropic, which means that one or more fundamental physical properties, for example, electronic resistivity, varies with direction. The specific graphites designated above as SFG-6, 10, and 15 have high anistropy.

Physical features of the invention as defined above are obtained by measurements from x-ray wide angle diffraction. Analysis of x-ray diffraction by crystals is well known in the art. According to analysis by Bragg diffraction, any set of equally spaced planes in a crystal acts as a set of mirrors for x-rays; for constructive interference, the beam must be incident on a set of planes that such a glancing angle θ indicated by: $2d\theta=m\lambda$, where d is the distance between planes and m is an integer. Therefore, as is well known in the art, the lattice constance for carbon material is determinable from 002 lines. Crystallite size along the c-axis ($L_c$) and the a-axis ($L_a$) is determinable from half widths of 002 and 110 lines, respectively, by x-ray diffraction with an internal standard. A typical internal standard for carbon analysis is silicon used with CUKα radiation. A description of the x-ray wide angle diffraction analysis method is given in U.S. Pat. No. 4,945,014 incorporated herein by reference in its entirety. The term "$d_{002}$" is used interchangeably with the term "C/2". From methods such as described in the '014 patent, one is able to obtain lattice constant, a, the average plane spacing, $d_{002}$ (C/2), and the size of the crystallite domains, $L_a$ and $L_c$, to character carbons. $L_a$ and $L_c$ are normally determined using the Scherrer equations as defined in the '014 patent incorporated herein by reference. Using the widths of the 002 and 110 peaks it is possible to obtain values for $L_a$ and $L_c$ as shown in Column 14 of U.S. Pat. No. 4,945,014 previously incorporated by reference in its entirety. Such analysis is based on the understanding that each carbon grain is made up of many small regions characterized by $L_a$ and $L_c$, which scatter x-rays incoherently with respect to one another; the small regions which scatter coherently within themselves are defined by $L_a$ and $L_c$.

The electrolyte usable with the specific carbons of the invention is a mixture of solvents. In one embodiment, the mixture of solvents comprises: (i) ethylene carbonate; and (ii) a solvent selected from the group consisting of propylene carbonate (PC), butylene carbonate (BC), and mixtures of PC and BC. It is preferred that the EC is present in an amount by weight which is at least as great as the amount of the selected solvent, namely, the PC, the BC, or the mixture of PC and BC. In another embodiment, the mixture of solvents comprises propylene carbonate and ethylene carbonate, with the ethylene carbonate being present in an amount by weight which is at least as great as the amount of the propylene carbonate. Desirably, the solvent mixture comprises EC and PC in a weight ratio of 50EC:50PC to 75EC:25PC. Alternatively, the mixture desirably comprises 50EC:50BC.

If desired, one or more additional organic solvents may be included in the solvent mixture. Such other organic solvents are selected from the group consisting of methyl ethyl carbonate (MEC), diethyl carbonate (DEC), dipropyl carbonate (DPC), dimethyl carbonate (DMC), and mixtures thereof. A preferred solvent mixture includes EC, PC and DMC where the EC is present in an amount not less than the amount by weight of the DMC and as stated earlier the EC is present is an amount by weight not less than of the PC. Accordingly, such solvent mixture preferably comprises the weight ratio 1EC:1PC:1DMC, corresponding to ⅓EC:⅓PC:⅓DMC and up to 50EC:25PC:25DMC. This corresponds to 1EC:1PC:1DMC to 2EC:1PC:1DMC. In still another desirable embodiment, the solvent mixture comprises 1EC:1PC:1BC to 2EC:1PC:1BC. Regardless of the nature of the one or more additional organic solvents besides EC and PC, the one or more other organic solvents preferably have a boiling point less than the boiling point of EC due to its tendency to solidify at ambient temperatures.

In preparing a battery constituting the negative electrode described above and the electrolyte, essentially any counter electrode may be selected so long as it is capable of reacting electrochemically with the graphite negative electrode material. Preferred are lithium transition metal oxide compounds. The negative electrode and positive electrode are assembled in a battery with an electrolyte which provides ionic conductivity between the positive and negative electrode. Typically and preferably, the electrolyte is in the form of an electrolyte separator which further comprises a solid matrix forming a network with voids interpenetrated by the solvent mixture in solute. Essentially any type of electrolyte separator arrangement may be selected so long as the solvent consists of the preferred organic solvents mentioned above. In one embodiment, the electrolyte separator has a solid matrix which is a polymeric acrylate formed from acrylate precursors which are applied to a surface of the cathode or anode and then polymerized to form an electrolyte/electrode composite. In another embodiment the matrix is a porous polypropylene or polyethylene sheet or a sheet of fiber glass material placed between the anode and cathode. The nature of the electrolyte separator is not critical so long as it is used with the solvent mixture of the invention along with the stated graphite negative electrode defined by the invention.

The propylene carbonate has a boiling point of approximately 240° C. and a melting temperature of approximately −49° C. It is a ringed structure. Other characteristics are as shown in Table IV. The ethylene carbonate has a boiling point of 248° C., a melting temperature of about 39° C. to 40° C., and is also a ringed structure. The optional third solvent mixture component is preferably dimethyl carbonate which contains a carbon situated between two single bond oxygens and carrying a double bond to a third oxygen. Each of the single bonded oxygen are bonded in turn to respective methanes. The DMC has a boiling temperature of 91° C. and a melting temperature of 4.6° C. As can be seen in Table IV, the boiling temperature of DMC is lower than the boiling temperature of the EC and lower than the boiling temperature of the PC which means the DMC is considerably more volatile. As can also be seen from Table IV, the melting temperature of DMC is lower than the melting temperature of EC. It is preferred that if one or more additional organic solvents are added to the basic EC/PC mixture of the invention, that such added organic solvent have a boiling temperature lower than that of the EC and preferably a melting temperature lower than the EC in order to help maintain the EC solvent in a liquid state.

In one embodiment, the lithium battery of the invention does not contain any metallic lithium. Such battery or cell comprises the electrolyte, positive electrode having an intercalation active material, and a negative electrode comprising the specific graphite of the invention. The graphite of the invention is in an initial condition, before charge (precharge) state or fully discharged state. In a lithiated, partially or fully charged state, the graphite active material is rendered to a state of charge represented by $Li_xC_6$ where x is greater than 0 and less than or equal to 1. Since the negative electrode is graphite without any lithium in an initial before charge state it is necessary to provide lithium for cell operation preferably in situ from the metallic lithium counter electrode which is then removed and replaced by the desired cathode intercalation active material; or from another component of the cell such as from a lithium-containing insertion compound of the cathode or a lithium-containing electrolyte.

In one embodiment, the lithium is provided in situ from the cathode (positive electrode) which is a lithium-containing compound. The positive electrode contains either a lithiated insertion compound or a lithium compound able to deintercalate lithium to provide lithium ions for transport to the negative electrode. During an initial charge of the cell, the positive electrode deintercalates lithium for intercalation into the negative electrode, and during discharge the positive electrode inserts lithium while lithium is extracted from the graphite negative electrode. The process is repeated during subsequent charge and discharge. Examples of such lithium-containing compounds are lithium transition metal chalcogenide compounds.

The term chalcogenide is generally taken to indicate compounds of oxygen, sulfur, selenium, and tellurium, accordingly, lithium transition metal oxygen compounds are included. Representative examples are $Li_xMn_2O_4$, $LiCoO_2$, $LiNiO_2$, $LiNiVO_4$, $LiCoVO_4$, mixtures such as $LiCoNiO_2$ and $LiTmO_2$ where Tm is a transition metal or combinations of transition metals, and mixtures thereof. In a desirable embodiment, the positive electrode is a lithium metal oxide such as lithium manganese oxide. The cathode preferably is $Li_xMn_2O_4$ with x equal to 1 in an as prepared, initial condition. The positive electrode active material (cathode) is characterized by its ability to deintercalate lithium ions during charge so that lithium ions may be intercalated into the graphite negative electrode. During charging of the battery, the quantity x in the positive electrode $Li_xMn_2O_4$ declines from about 1 down to about 0. In the ideal case, all of the lithium would be deintercalated from the positive electrode and the value of x would decline to 0. Since some of the lithium may not be deintercalated during cell operation, subsequent charge and discharge, the value of x generally varies, with x being greater than 0 and less than or equal to 1.

In an alternative embodiment, the electrolyte comprises a lithium compound from which lithium ions may be released for intercalation, in situ, into the uncharged graphite negative electrode. A preferred lithium compound of the electrolyte is a lithium salt. Examples include $LiPF_6$, $LiAsF_6$, $LIB_4$, $LiClO_4$, and $LiCF_3SO_3$.

In still another embodiment, some portion of the lithium intercalated into the graphite negative electrode upon charge is supplied by the lithium compound contained in the electrolyte, and some portion of the lithium is supplied to the negative electrode during charge by deintercalation from the positive electrode active material.

As can be seen from the embodiments described above, advantageously the cell may be prepared in a discharged condition. In another embodiment, the negative electrode graphite is prepared in a precharged condition either external of the cell, or internally in the cell against a metallic lithium counter electrode where such metallic electrode is then replaced with the cathode material described hereinabove. The desired electrochemical battery is prepared using this prelithiated graphitic anode in combination with the desired cathode containing the desired positive electrode active material, forming the battery (cell) of the invention.

A description of the electrochemical cell or battery which uses the novel active material and electrolyte of the invention will now be described. By convention, an electrochemical cell comprises a first electrode, a counter electrode which reacts electrochemically with the first electrode, and an electrolyte which is capable of transferring ions between the electrodes. A battery refers to one or more electrochemical cells. Referring to FIG. 1, an electrochemical cell or battery (10) has a negative electrode side (12), a positive electrode side 14, and an electrolyte/separator 16 therebetween. The negative electrode is the anode during discharge, and the positive electrode is the cathode during discharge. The negative electrode side includes current collector 18, typically of nickel, iron, stainless steel, and copper foil, and negative electrode active material 20. The positive electrode side includes current collector 22, typically of aluminum or stainless steel, and such foils having a protective conducting coating foil, and a positive electrode active material 24. The electrolyte/separator 16 is typically a solid electrolyte, or separator and liquid electrolyte. Solid electrolytes typically refer to polymeric matrixes which contain an ionic conductive medium. Liquid electrolytes typically comprise a solvent and an alkali metal salt which form an ionically conducting liquid. In this latter case, the separation between the anode and cathode is maintained, for example, by a relatively inert layer of material such as glass fiber. The electrolyte is not an essential feature of the invention. Essentially, any ionically conducting electrolyte may be used. Essentially any method may be used to maintain the positive and negative electrodes spaced apart and electrically insulated from one another in the cell. Accordingly, the essential features of the cell are the positive electrode, a negative electrode electrically insulated from the positive electrode, and an ionically conducting medium between the positive and negative electrodes. Examples of a suitable separator/electrolyte, solvents, and salts are described in U.S. Pat. No. 4,830,939 showing a solid matrix containing an ionically conducting liquid with an alkali metal salt where the liquid is an aprotic polar solvent; and U.S. Pat. Nos. 4,935,317; 4,990,413; 4,792,504; and 5,037,712. Each of the above patents is incorporated herein by reference in its entirety.

In one embodiment, the electrolyte/separator comprises a solid polymeric matrix formed by polymerizing an organic or inorganic monomer which when used in combination with the other components of the electrolyte, renders the electrolyte solid. Suitable solid polymeric matrices are known in the art and include solid matrices formed from inorganic polymers, organic polymers, or mixtures comprising same. Preferably, the solid polymeric matrix is an organic matrix derived from a solid matrix forming monomer and from partial polymers of a solid matrix forming monomer. See, for example, U.S. Pat. No. 4,925,751, which is incorporated herein by reference.

A particularly preferred solid polymeric matrix electrolyte is prepared from 36.26 grams of propylene carbonate, 3.45 grams of trimethyl propyl triacrylate, 36.26 grams of ethylene carbonate, and 13.79 grams of urethane acrylate which are combined at room temperature until homogenous. Then, 1.47 grams of polyethylene oxide film forming agent having a number average molecular weight of about 600,000 (available as Polyox WSR-205 from Union Carbide Chemicals and Plastics, Danbury, Conn.) is added to the solution and then dispersed while stirring. The solution is then heated until the film forming agent is dissolved. The solution is then cooled to a temperature less than 48° C. and then 8.77 grams of $LiPF_6$ (metal salt) are added to the solution while thoroughly mixing. The solution is preferably then degassed to provide for an electrolyte solution wherein little, if any, of the $LiPF_6$ salt decomposes. Next, the electrolyte mixture is coated by a slot die coater or other variety of coater to a thickness of about 25 to 50 microns onto the surface of a dried electrode slurry, and preferably applied to the dried cathode slurry. In such a case, the solid electrolyte cell is assembled by laminating the anode half cell component to the cathode half cell component so that the electrolyte is positioned between the anode and the cathode.

In another embodiment, the electrolyte used to form the completed cell is a combination of EC/PC and optionally one or more other organic solvents having a boiling less than the boiling point of the EC. The positive and negative electrodes are maintained in a separated condition using a fiber glass layer or a layer of porous polypropylene or porous polyethylene, about 25 microns thick. An example of a separator is sold under the designation Celgard™. Hoechst-Celanese Corp., Celgard 2400™, porous polypropylene, 25 microns thick.

The electrolyte composition typically comprises from about 5 to about 25 weight percent of the inorganic salt based on the total weight of the electrolyte; preferably, from about 10 to 20 weight percent; and even more preferably from about 10 to about 15 weight percent. The percentage of salt depends on the type of salt and electrolyte solvent employed.

For liquid electrolytes, the electrolyte composition typically comprises from about 80 to about 99 weight percent and preferably from about 85 to about 95 weight percent electrolyte solvent based on the total weight of the electrolyte. For solid electrolytes, the electrolyte composition typically comprises from about 40 to about 80 weight percent electrolyte solvent based on the total weight of the electrolyte; preferably from about 60 to about 80 weight percent; and even more preferably about 72 weight percent. For solid electrolytes, the electrolyte composition typically comprises from about 5 to about 30 weight percent of the solid polymeric matrix based on the total weight of the electrolyte and preferably comprises from about 10 to about 20 weight percent.

In summary, the graphite negative electrode of the invention essentially consists of the specific graphite material as described herein and a binder. The positive electrode of the invention is made by mixing a binder, the active material, and carbon powder (particles of carbon) which enhance conductivity of the active material. The binder composition is desirably a binder/electrolyte such as polymeric acrylates (plastics) which are x-linked by radiation curing or may be based on conventional electrolyte/binder systems. The binder/electrolyte is preferably the polymeric acrylate (plastic) with ionic conduction capability. After mixing, the resulting paste, containing the binder, active material, and carbon (for cathode), is coated onto a current collector, and any polymer content is polymerized, and cross-linked by heat radiation or other curing means.

TABLE I

| Carbon Material | Surface Area ($m^2/g$) (BET) | Coherence Length $L_c$ (nm) | Density $(g/cm^3)^2$ | Particle Size[1] | Median Size $d_{50}$ (μm) | Interlayer Distance c/2 (nm) |
|---|---|---|---|---|---|---|
| SFG-6 | 15.2 | >100 | 2.26 | <6 | 3.2 | 0.3355 |
| SFG-10 | 11.1 | >150 | 2.26 | <12 | 5.8 | 0.3355 |
| SFG-15 | 8.8 | >120 | 2.26 | <16 | 8.1 | 0.3355 |
| SFG-44 | 4.2 | <200 | 2.26 | <48 | 22 | 0.3355 |
| KS-10 | 16 | 80 | 2.255 | <12 | 5.9 | 0.3357 |
| KS-15 | 14 | 90 | 2.255 | <16 | 7.7 | 0.3356 |
| KS-25 | 13 | 90 | 2.255 | <24 | 10.5 | 0.3356 |
| BG-35 | 7 | >1000 | 0.195 | <36 | 17 | N/A |
| F-399 | 23 | >1000 | 2.20 | <35 | 16 | N/A |
| MCMB-25-28 | N/A | >1000 | 2.24 | 37 | 22.5 | 0.336 |

[1]Maximum size for at least 90% by weight of graphite particles, interpolated for F-399 based on 87% less than 31 microns (μm), and 96% less than 44 micron (μm).
[2]In xylene.
Note:
SFG and KS series are synthetic, anisotropic graphite. BG series is a flake natural graphite. F series is natural graphite. MCMB series is meso phase micro beads.

TABLE II

Graphite SPG-15 Specifications

Guaranteed Values

| | | |
|---|---|---|
| Ash | (%) max | 0.15 |
| Moisture | (%) max | 0.5 |
| Crystallite Height | (nm) min | 100 |
| Interlayer Distance | (nm) | 0.3354–0.3358 |
| Particle Size <16 micron | (%) min, Laser | 90 |

Typical Values

Purity

| | | |
|---|---|---|
| Ash | (%) | 0.1 |
| Al | (ppm) | 35 |
| As | (ppm) | <1 |
| Ca | (ppm) | 170 |
| Co | (ppm) | <1 |
| Cr | (ppm) | 4 |
| Cu | (ppm) | <1 |
| Fe | (ppm) | 135 |
| Mo | (ppm) | <1 |
| Ni | (ppm) | 3 |
| Pb | (ppm) | <1 |
| Sb | (ppm) | <2 |
| Si | (ppm) | 450 |
| Ti | (ppm) | 7 |
| V | (ppm) | 2 |
| S | (ppm) | 60 |

Crystallinity

| | | |
|---|---|---|
| LC | (nm) | >120 |
| c/2 ($d_{002}$) | (nm) | 0.3355 |

Density

| | | |
|---|---|---|
| Xylene | (g/ccm) | 2.26 |
| Scott | (g/ccm) | 0.09 |

Specific Surface Area

| | | |
|---|---|---|
| BET | (sqm/g) | 8.8 |

Particle Size Distribution (Laser Diffraction)

| | | |
|---|---|---|
| <2 micron | (%) | 2 |
| <4 micron | (%) | 13 |
| <6 micron | (%) | 30 |
| <8 micron | (%) | 49 |
| <12 micron | (%) | 79 |
| <16 micron | (%) | 94 |
| <24 micron | (%) | 99 |
| <48 micron | (%) | 100 |
| $d_{50}$ | (μm) | 8.1 |

TABLE III

Graphite SPG-6

Particle Size Distribution (Laser Diffraction)

| | | |
|---|---|---|
| <1 micron | (%) | 2.8 |
| <1.5 micron | (%) | 5.1 |
| <2 micron | (%) | 16.9 |
| <3 micron | (%) | 47.7 |
| <4 micron | (%) | 68.8 |
| <6 micron | (%) | 95.8 |
| <8 micron | (%) | 97.3 |
| <12 micron | (%) | 100 |
| $d_{50}$ | (μm) | 3.2 |

Graphite SFG-10

Particle Size Distribution (Laser Diffraction)

| | | |
|---|---|---|
| <1 micron | (%) | 0.4 |
| <2 micron | (%) | 4.8 |
| <4 micron | (%) | 29.5 |
| <6 micron | (%) | 57.1 |
| <8 micron | (%) | 75.3 |
| <12 micron | (%) | 94.9 |
| <16 micron | (%) | 98.5 |
| <32 micron | (%) | 100 |
| $d_{50}$ | (μm) | 5.8 |

TABLE IV

Characteristics of Organic Solvents

| | PC | EC | DMC | DEC | BC | MEC | DPC |
|---|---|---|---|---|---|---|---|
| Boiling Temperature (C) | 240 | 248 | 91.0 | 126 | 230 | <126 | 167–168 |
| Melting Temperature (C) | −49 | 39–40 | 4.6 | −43 | — | −55 | — |
| Density (g/cm$^3$) | 1.198 | 1.322 | 1.071 | 0.98 | 1.139 | 1.007 | 0.944 |
| Solution Conductivity (S/cm) | $2.1 = 10^{-9}$ | $<10^{-7}$ | $<10^{-7}$ | $<10^{-7}$ | $<10^{-7}$ | $6 \times 10^{-9}$ | $<10^{-7}$ |
| Viscosity (cp) at 25° C. | 2.5 | 1.86 (at 40° C.) | 0.59 | 0.75 | 2.52 | 0.65 | — |
| Dielectric Constant at 20° C. | 64.4 | 89.6 (at 40° C.) | 3.12 | 2.82 | — | — | — |
| Molecular Weight | 102.0 | 88.1 | 90.08 | 118.13 | 116.12 | 104.10 | 146.19 |
| H$_2$O Content | <10 ppm | <10 ppm | <10 ppm | <10 ppm | <10 ppm | <10 ppm | <10 ppm |
| Electrolytic Conductivity (mS/cm) 20° C. 1M LiAsF$_6$ | 5.28 | 6.97 | 11.00 (1.9 mol) | 5.00 (1.5 mol) | <3.7 | — | — |

TABLE A

Constant Current Cycling of Li/Carbon Cells Using EC/PC 50:50 w/1M LiPF6

| Carbon Material of Half Cell | Supplier | Active Mass/[mg] | Reversible Specific Capacity/[mAh/g] | 1st Cycle Capacity Loss [%] |
| --- | --- | --- | --- | --- |
| SFG-6 | Lonza | 24.5 | 339 | 22 |
| SFG-10 | Lonza | 25.6 | 344 | 19 |
| SFG-15 | Lonza | 12.0 | 351 | 18 |
| SFG-44 | Lonza | 15.6 | 0 | 100 |
| KS-10 | Lonza | 17.5 | 74 | 89 |
| KS-15 | Lonza | 12.2 | 105 | 95 |
| KS-25 | Lonza | 14.9 | 0 | 100 |
| BG-35 | Superior | 11.5 | 0 | 100 |
| F-399 | Alumina Trading | 17.5 | 200 | 57 |
| MCMB25-28 | Alumina Trading | 48.0 | 225 | 29 |
| 50:50 by weight MCMB2528/SFG-15 | Mixed Anode | 18.5 | 308 | 56 |

Note:
SFG and KS series are synthetic, anisotropic graphite. BG series is a flake natural graphite. F series is natural graphite. MCMB series is meso phase micro beads.

TABLE B

Constant Current Cycling of Li/Carbon Cells Using EC/PC 25:75 w/1M LiPF6

| Carbon Material of Half Cell | Supplier | Active Mass/[mg] | Reversible Specific Capacity/[mAh/g] | 1st Cycle Capacity Loss [%] |
| --- | --- | --- | --- | --- |
| SFG-15 | Lonza | 18 | 0 | 100 |
| MCMB25-28 | Alumina Trading | 30 | 293 | 46 |
| 50:50 by weight MCMB2528/SFG-15 | Mixed Anode | 19 | 0 | 100 |

TABLE C

Constant Current Cycling of Li/Carbon Cells Using EC/PC 75:25 w/1M LiPF6

| Carbon Material of Half Cell | Supplier | Active Mass/[mg] | Reversible Specific Capacity/[mAh/g] | 1st Cycle Capacity Loss [%] |
| --- | --- | --- | --- | --- |
| SFG-15 | Lonza | 18.6 | 355 | 18 |
| SFG-44 | Lonza | 16.7 | 305 | 68 |
| KS-10 | Lonza | 17.5 | 189 | 77 |
| MCMB25-28 | Alumina Trading | 32.0 | 288 | 16 |
| 50:50 by weight MCMB2528/SFG-15 | Mixed Anode | 18.3 | 311 | 23 |

TABLE D

Constant Current Cycling of Li/Carbon Cells Using EC/PC/DMC 1:1:1 w/1M LiPF6

| Carbon Material of Half Cell | Supplier | Active Mass/[mg] | Reversible Specific Capacity/[mAh/g] | 1st Cycle Capacity Loss [%] |
| --- | --- | --- | --- | --- |
| SFG-15 | Lonza | 18.2 | 346 | 22 |
| MCMB2828 | Alumina Trading | 28.0 | 0 | 100 |
| 50:50 by weight MCMB2528/SFG-15 | Mixed Anode | 18.1 | 293 | 40 |

TABLE E

Constant Current Cycling of Li/Carbon
Cells Using PC/DMC 50:50 w/1M LiPF6

| Carbon Material of Half Cell | Supplier | Active Mass/[mg] | Reversible Specific Capacity/[mAh/g] | 1st Cycle Capacity Loss [%] |
|---|---|---|---|---|
| SFG-15 | Lonza | 18.1 | 0 | 100 |

TABLE F

| | Supplier | Active Mass | Rev. Specific Capacity (mAh/g) | First Cycle Capacity Loss |
|---|---|---|---|---|
| SFG-15 | Lonza | 18.5 | 307 | 38% |
| SFG-15 | Lonza | 18.5 | 324 | 36% |
| KS-15 | Lonza | 12.2 | 105 | 93% |
| KS-15 | Lonza | 12.2 | 90 | 94% |

TABLE G

| Electrode Material | Active Mass (mg) | Rev. Specific Capacity (mAh/g) | First Cycle Capacity Loss |
|---|---|---|---|
| $Li_xMn_2O_4$ | 45.0 | 119 | 10% |
| $Li_xMn_2O_4$ | 45.0 | 110 | 11% |

EXAMPLE

Positive Electrode

The positive electrode containing $LiMn_2O_4$ was prepared by the following method. For the positive electrode, the content was as follows: 50 to 90 percent by weight active material ($LiMn_2O_4$); 5 to 30 percent carbon black as the electric conductive diluent; and 3 to 20 percent binder preferably chosen to enhance ionic conductivity. The stated ranges are not critical. The amount of active material may range from 25 to 85 weight percent. The formation of each electrode will now be described. The positive electrode was prepared from mixtures of lithium-manganese oxide (active material) and EPDM (ethylene propylene diene monomer) as the binder, Shawinigan Black® was used as the carbon powder conductive diluent. The carbon powder conductive diluent is used to enhance electronic conductivity of the lithium-manganese oxide. Shawinigan Black®, available from Chevron Chemical Company, San Ramone, Calif., has a BET average surface area of about 70 ±5 square meters per gram. Other suitable carbon blacks are sold under the designation Super P™ and Super S™ available from MMM, a subsidiary of Sedema, which carbons have BET surface areas of about 65 ±5 square meters per gram. (MMM Sedema, S.A., has its headquarters in Brussels, Belgium.) Examples of suitable polymeric binders include EPDM (ethylene propylene diene termonomers), PVDF (polyvinylidene difluoride), ethylene acrylic acid copolymer, EVA (ethylene vinyl acetate copolymer), copolymer mixtures, and the like. It is desirable to use either PVDF available from Polysciences Corporation with a molecular weight of 120,000 or EPDM available from Exxon Corporation and sold under the designation EPDM 2504™. EPDM is also available from The Aldrich Chemical Company. The description of carbon powders and binders constitute representative examples and the invention is not limited thereby. For example, other carbon powders are available from Exxon Chemicals, Inc., Chicago, Ill. under the trade name Ketjen Black EC 600 JD® and polyacrylic acid of average molecular weight 240,000 is commercially available from BF Goodrich, Cleveland, Ohio under the name Good-Rite K702™. The positive electrodes of the invention comprised mixtures of the active material $LiMn_2O_4$, the binder (EPDM), and the carbon particles (Shawinigan Black®). These were mixed and blended together with a solvent. Xylene is a suitable solvent. The mixture was then coated onto an aluminum foil current collector to achieve a desired thickness for the final electrode.

The $Li_xMn_2O_4$ powders which form the basis of the active material for the cathode, can be prepared by a method as described by Barboux, Tarascon et al in U.S. Pat. No. 5,135,732, issued Aug. 4, 1992 and incorporated by reference in its entirety. This reference is illustrative of a suitable method and is not limiting. This method produced active material which is used as the cathode (positive electrode) active material. Such methods are used to produce positive electrodes for use with negative electrodes of metallic lithium. There is also described a 3 volt lithium-manganese oxide cathode material for use with metallic anodes in an article entitled "A 3 Volt Lithium-Manganese Oxide Cathode for Rechargeable Lithium Batteries" by Haitao Huang and Peter Bruce as published in J. Electrochem. Soc., Volume 141, No. 7, July 1994. The manganese oxide cathode of the nominal general formula $LiMn_2O_4$ is prepared with a specific composition $LiMn_2O_{4.1}$. These are considered to be essentially a defect lithium-manganese oxide spinel $LiMn_2O_{4.1}$ prepared by a solution route. Accordingly, the term "nominal general formula $Li_1Mn_2O_4$" represents a family of suitable $LiMn_2O_4$ type compositions including those with the defect spinel with a higher average oxidation state than the typical stoichiometric $LiMn_2O_4$. Other spinel type materials are suitable, such as, $Li_2Mn_4O_9$ and $Li_4Mn_5O_{12}$ as well as chemical manganese dioxide, a mixture $\gamma/\beta MnO_2$, and lithiated spinels. In the Huang et al process, a minor amount of carbon is added to the solution in order to achieve the defective spinel. However, such carbon is less than that typically included in a cathode formulation and additional carbon is typically added as described more fully below.

Negative Electrode

The negative electrode of the invention preferably comprises about 80 to about 95 percent by weight of the specific graphite particles, and more preferably about 90 percent by weight with the balance constituted by the binder. Preferably, the anode is prepared from a graphite slurry as follows. A polyvinylidene difluoride (PVDF) solution was prepared by mixing 300 grams of 120,000 MW PVDF (PolyScience) in 300 ml of dimethyl formamide. The mixture was stirred for 2 to 3 hours with a magnetic stirrer to dissolve all of the PVDF. The PVDF functions as a binder for the graphite in the anode. Next, a PVDF/graphite slurry was prepared by first adding 36 grams of graphite (SFG-15) into about 38.5 grams of the PVDF solution. The mixture was homogenized with a commercial homogenizer or blender. (For example, Tissue Homogenizer System from Cole-Parmer Instrument Co., Niles, Ill.). The viscosity of the slurry was adjusted to about 200 cp with additional PVDF solution. The slurry was coated onto a bare copper foil by standard solvent casting techniques, such as by a doctor blade type coating. (Alternatively, the slurry can be coated onto a copper foil having a polymeric adhesion promoter layer, described above.) In preparing the slurry, it is not necessary to grind or dry the graphite, nor is it necessary to add conductive carbon black to the graphite anode formulation. Finally, the electrodes are dried at approximately 150° C. for 10 hours to remove residual water prior to making the electrochemical cells.

Electrolyte

Figure 2:
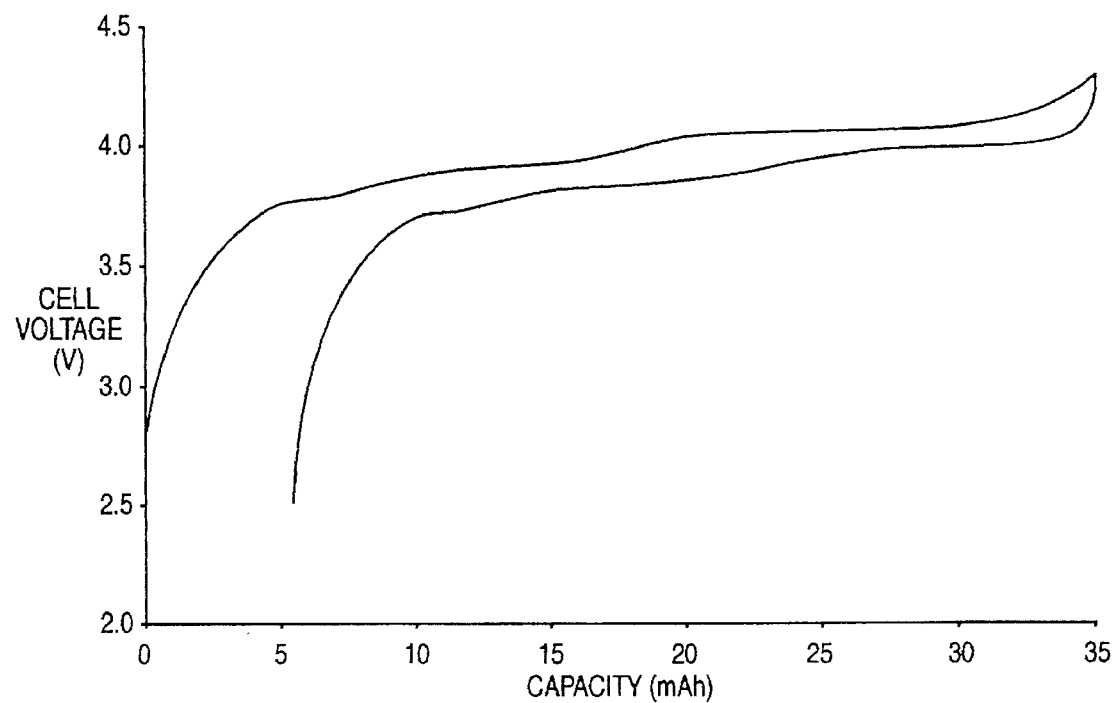
FIG. 2 is an EVS (Electrochemical Voltage Spectroscopy) voltage/capacity profile for a cell embodying the preferred graphitic carbon of the invention in combination with a lithium manganese oxide cathode material in an electrolyte comprising ethylene carbonate and propylene carbonate in a weight ratio of 1:1 and including a 1 molar concentration of $LiPF_6$ salt. The graphitic anode and lithium manganese oxide cathode are maintained spaced apart by a separator of glass which is interpenetrated by the mixed solvent of the invention and the salt. The conditions are ±10 mV steps, between 2.5 and 4.3 volts, and the critical limiting current density is less than or equal to 0.1 mA/cm$^2$.
Figure 3:
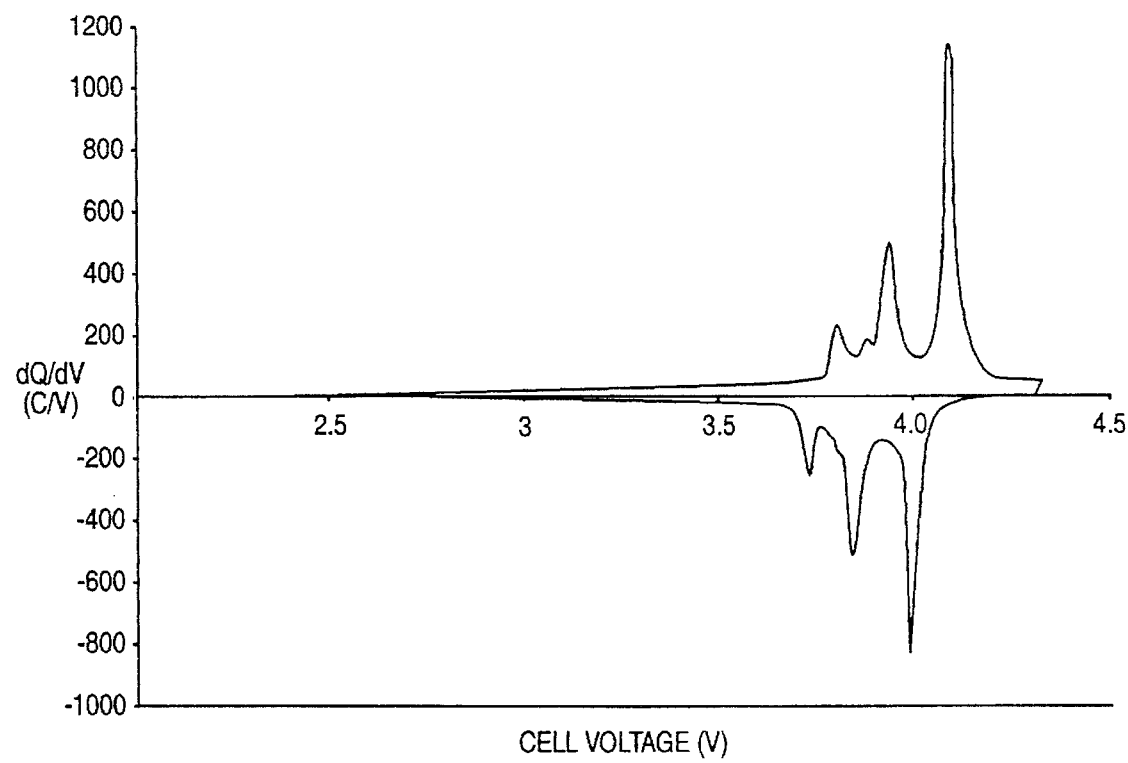
FIG. 3 is an EVS differential capacity plot for the cell as described in connection with FIG. 2.

The electrolyte used to form the completed cell as tested in FIGS. 2 and 3 comprised ethylene carbonate and propylene carbonate in a ratio of 1:1 by weight (1EC:1PC, by weight). The positive and negative electrodes were maintained in a separated condition using a fiber glass layer. The electrolyte salt was a concentration of 1M $LiPF_6$ providing a liquid electrolyte which interpenetrated the void spaces of the fiber glass layer.

Various methods for fabricating electrochemical cells and for forming electrode components are described herein. The invention is not, however, limited by any particular fabrication method as the novelty lies in the unique negative electrode material itself and combination of positive and negative electrode materials. Accordingly, additional methods for preparing electrochemical cells and batteries may be selected and are described in the art, for example, in U.S. Pat. No. 5,435,054 (Tonder & Shackle); U.S. Pat. No. 5,300,373 (Shackle); U.S. Pat. No. 5,262,253 (Golovin); U.S. Pat. No. 4,668,595; and U.S. Pat. No. 4,830,939 (Lee & Shackle). Each of the above patents is incorporated herein by reference in its entirety.

FIG. 2 shows a voltage profile of a rocking chair battery, based on $LiMn_2O_4$ positive electrode and the graphite negative electrode of the invention, using the SFG-15 graphite. This was obtained in a three-electrode cell where the additional reference electrode (Li) is used in order to discriminate individual responses from the positive and negative electrodes. FIG. 2 is based on 29 mAh reversible capacity, 2.4 milliamp hours per square centimeter, 12 square centimeter electrodes, a graphite active material loading of about 6.5 milligrams per square centimeter, and a $LiMn_2O_4$ loading of about 18.4 milligrams per square centimeter. The electrochemical properties of the electrodes was determined using a 2-electrode cell whereby electrochemical and kinetic data are recorded using Electrochemical Voltage Spectroscopy (EVS) technique. Electrochemical and kinetic data were recorded using the Electrochemical Voltage Spectroscopy (EVS) technique. Such technique is known in the art as described by J. Barker in Synth, Met 28, D217 (1989); Synth. Met. 32, 43 (1989); J. Power Sources, 52, 185 (1994); and Electrochemica Acta, Vol. 40, No. 11, at 1603 (1995). The EVS voltage/capacity profile as shown in FIG. 2 is for the cell SFG-15/$LiMn_2O_4$, with the EC/PC electrolyte in a weight ratio of 50:50 EC/PC and including the $LiPF_6$ salt. FIG. 2 clearly shows and highlights the very high and heretofore unexpected degree of reversibility of lithium ion reactions of the graphitic electrode of the invention. The negative electrode showed a performance of 374 milliamp hours per gram and the positive electrode showed a performance of 132 milliamp hours per gram on the first discharge. In FIG. 2 the capacity in is essentially 34.8 milliamp hours and the capacity out is essentially 29.2 milliamp hours resulting in a capacity loss of approximately 5.6 milliamp hours corresponding to a remarkably low 16.1 percent loss. Accordingly, the electrochemical cell of the invention has a first cycle capacity loss of less than 20 percent and on the order of 10 to 20 percent where the first cycle capacity loss in percent is calculated according to Equation I.

$$\frac{((FC \text{ charge capacity}) - (FC \text{ discharge capacity})) \times 100\%}{FC \text{ charge capacity}}$$

where FC stands for first cycle. FIG. 3 is an EVS of the differential capacity plot based on FIG. 2 for SFG-15/$LiMn_2O_4$ with 1EC:1PC by weight, with $LiPF_6$ salt. As can be seen from FIG. 3, the symmetrical nature of peaks indicates good electrochemical reversibility, with small peak separations on charge (above the axis) and discharge (below the axis). This corresponds to low overvoltage. There are no peaks that can be related to irreversible reactions. All peaks above the axis have corresponding peaks below. If electrolyte (i.e., PC) breakdown on graphite was present, there would have been an irreversible charge consumption around 3.2 volts of cell voltage on charge. Absence of such irreversible charge consumption is further evidence of the unique and unexpected advantage of the present invention.

Figure 4A:
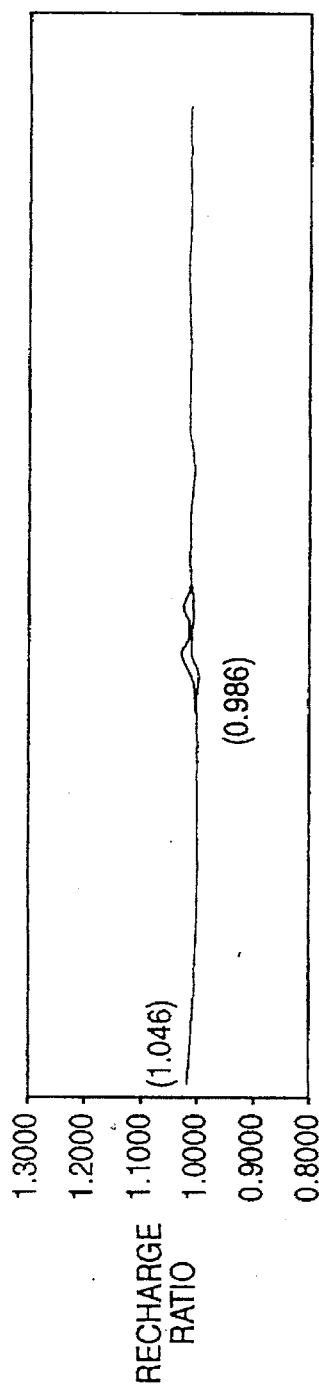
FIG. 4 is a two part graph with FIG. 4A showing the excellent rechargability of the LiMn$_2$O$_4$/graphite cell.
FIG. 4B shows the excellent cycling and capacity of the cell. Charge and discharge are at 1 mA/cm$^2$, 2.5–4.3 volts.
Figure 4B:
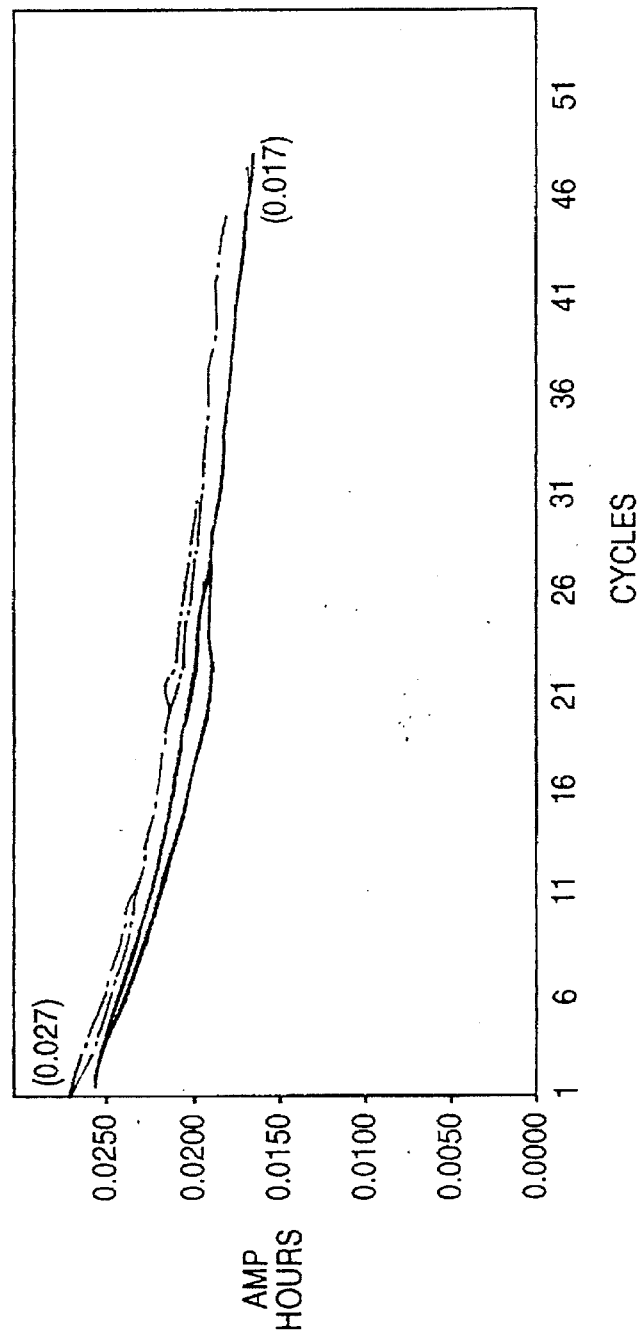

FIG. 4 is a two part graph with FIG. 4A showing the excellent rechargability of the $LiMn_2O_4$/graphite cell. FIG. 4B shows the excellent cycling and capacity of the cell. The capacity was determined at constant current cycling, plus or minus 1 milliamp per centimeter squared, for cycles 1 to 47; with a voltage range of 2.5 to 4.3 volts. As in the case for FIGS. 2 and 3, the cell electrolyte consists of 1EC:1PC by weight, with 1 molar $LiPF_6$; and the separator is a glass fiber. As in the case of FIGS. 2 and 3 the $LiMn_2O_4$ is estimated at 132 milliamp hours per gram and the graphite anode of the invention is estimated at 374 milliamp hours per gram.

It should be noted that FIGS. 4A (recharge ratio) and 4B (discharge capacity) show the performance of four $LiMn_2O_4$/graphite cells prepared in the same manner according to the invention. As shown in FIG. 4A the recharge ratio is very high, at least 0.0986 after 47 cycles. As shown in FIG. 4B after up to 47 cycles, the capacity remains high at between about 0.017 and 0.02 amp hours or 17 to 20 milliamp hours. This performance is far in excess of the performance expected by a cell which contains a graphite negative electrode and a propylene carbonate solvent mixture. This result is truly advantageous and amazing, especially given that capacities are maintained over a large number of cycles.

The remarkable performance of the specific graphites of the invention were further investigated to verify these heretofore unexpected results by comparison to other carbons (carbonaceous material) attempted to be used as electrode material. Such tests were conducted at constant current cycling. The carbon materials were cycled against metallic lithium anode using different electrolytes. In Table A the electrolyte was EC/PC in a 50:50 weight percent with 1 molar $LiPF_6$. In Table B the electrolyte was 25EC:75PC by weight with 1 molar $LiPF_6$. In Table C the cell electrolyte was 75EC:25 PC with 1 molar $LiPF_6$. In Table D the electrolyte was ethylene carbonate, propylene carbonate, and dimethyl carbonate in a ratio by weight of 1:1:1, also with 1 molar $LiPF_6$ as the salt. The electrolyte of Table E consisted of propylene carbonate and dimethyl carbonate in a ratio of 50:50 with 1 molar LiPF$_6$. Table F contains results for 50:50 by weight EC:BC (ethylene carbonate/butylene carbonate) with 1 molar LiPF$_6$, at ±0.2 mA/cm$^2$, 2.0–0.01 volts for SFG-15 and KS-15. Table G contains results of testing the same electrolyte as per Table F against the Li$_x$Mn$_2$O$_4$ active material, at 3.0–4.3 volts. In all cases, the test electrode and the lithium metal counter electrode were separated by a glass fiber which was interpenetrated by the electrolyte solvent comprising the organic solvents named above with 1 molar LiPF$_6$ salt dissolved therein. More specifically, data as shown in Tables A through E was obtained using lithium metal/carbon half cells to compare the inventive graphite compositions to other carbon materials. Each half cell includes a lithium metal anode with an active material size of approximately 2.4 cm$^2$ area of the disk-shaped electrode. The cathode comprises the carbon material as shown in Tables A through E, with 10 percent by weight binder. The glass fiber separator is about 10 microns thick. The liquid electrolyte comprises a salt as stated for each of the respective cells identified in Tables A through E. The specific capacity of the anode material is at constant current cycling at about ±0.2 milliamps per square centimeter, and the first cycle capacity loss was measured for each half cell and calculated in accordance with Equation I stated earlier. The voltage limits were 2.0 and 0.01 volts. Results shown in Tables A through E will now be described.

As can be seen in Results Table A, several types of carbons were tested to determine suitability in combination with EC/PC 50:50 by weight and 1M LiPF$_6$. In Results Table A, only the graphite types SFG-6, 10, and 15 showed reversible anode capacity in of over 300 milliamp hours per gram in combination with capacity loss less than 25 percent. This result is quite remarkable since synthetic graphites of similar particle size, KS-10 and 15 demonstrated extremely poor results, namely, reversible capacity as low as 0 and first cycle capacity loss as high as 100 percent. The KS series of similar particle size has a very low L$_c$ compared to SFG. The BG-35, F-399, and MCMB 25–28 characterized by very high L$_c$ compared to SFG, showed consistently poor performance.

Results Table B contains data showing performance where the electrolyte solvent contains a high concentration of PC with respect to EC, namely, 25EC:75PC, by weight, with 1M LiPF$_6$. In all cases, the reversible capacity is very poor and the first cycle capacity loss is on the order of 45 to 100 percent. This shows the striking and heretofore unexpected sensitivity of the electrolyte solvent composition with respect to the carbon.

Results Table C shows the combination of 75EC:25PC, by weight with 1M LiPF$_6$. One of the graphites of the invention (SFG-15) is the only carbonaceous material showing a reversible specific capacity greater than 300 milliamp hours per gram with a first cycle loss of less than 20 percent. Only in the case where the undesirable MCMB 25–28 is mixed with SFG-15 (50:50 by weight) is there a capacity greater than 300 milliamp hours per gram. However, the loss is over 20 percent.

Results Table D shows the constant current cycling of lithium/carbon cells using a ratio of ethylene carbonate (EC)/propylene carbonate (PC)/dimethyl carbonate (DMC) of 1:1:1 on a weight percent basis and includes 1 molar LiPF$_6$ as the salt. As can be seen from Results Table D, the only cell showing reversible specific capacity greater than 300 milliamp hours per gram is with the SFG-15 graphite which shows a first cycle capacity loss of less than 25 percent. The performance of the other comparative cells demonstrates reversible specific capacity less than 300 milliamp hours per gram and a first cycle capacity loss of 40 to 100 percent.

Results Table E shows the constant current cycling of an Li/graphite cell using propylene carbonate and dimethyl carbonate in a ration of 1:1 by weight with 1 molar LiPF$_6$ salt dissolved therein. The SFG-15 graphite anode of the invention did not perform in this cell as the first cycle capacity loss was 100 percent. Results Tables B and E when examined carefully together demonstrate the extreme sensitivity of the type of carbon material, and of the composition, and concentration of components of the electrolyte. An electrolyte containing too great an amount of PC with respect to the EC does not perform; and an electrolyte containing only PC and DMC does not perform.

The results in Table F show that a combination of EC/BC is workable with reasonably high reversible specific capacity 307 to 325 mAh/g with SFG-15, and first cycle irreversible capacity loss less than 40 percent. The KS-15 has very poor performance in EC/BC. The remarkable stability of the electrolyte of the invention is shown in Table G, where EC/BC is tested against the Li$_x$Mn$_2$O$_4$ active material. The electrolyte comprising EC/PC is likewise stable when used with Li$_x$Mn$_2$O$_4$.

While this invention has been described in terms of certain embodiments thereof, it is not intended that it be limited to the above description, but rather only to the extent set forth in the following claims.

The embodiments of the invention in which an exclusive property or privilege is claimed are defined in the following claims.

We claim:

1. A battery which comprises a first electrode, a counter electrode which forms an electrochemical couple with said first electrode, and an electrolyte:

a) said first electrode consisting essentially of graphite particles and a binder, where on the basis of 100 parts by weight, said binder constitutes up to about 15 parts and said graphite particles constitute at least about 85 parts; said graphite particles having an interlayer distance spacing of 002 planes (d$_{002}$) as determined by x-ray diffraction of 0.3350 to 0.3360 nanometers (nm), a crystallite size in the, direction of c-axis (L$_c$) being greater than about 100 nanometers (nm) and less than about 200 nanometers (nm), a BET surface area of greater than about 6 square meters per gram (m$^2$/g) and up to about 16 square meters per gram (m$^2$/g), and at least 90 percent by weight of said graphite particles having a size less than 16 microns (µm); and b) said electrolyte comprising a solute and a solvent mixture; said solute consisting essentially of a salt of a metal; said solvent mixture consisting essentially of propylene carbonate (PC), ethylene carbonate (EC), and optionally one or more other organic solvents having a boiling point less than the boiling of point of said EC; with the ethylene carbonate being present in an amount by weight which is at least as great as the amount of propylene carbonate and at least as great as the amount of any said other solvent, respectively.

2. The battery according to claim 1 wherein said counter electrode comprises an intercalation active material; and wherein said battery is further characterized by a first cycle capacity loss of less than about 25 percent of first cycle charge capacity and said first electrode further characterized by a reversible capacity of greater than about 330 milliamp hours per gram (mAh/g).

3. The battery according to claim 1 wherein said binder is polyvinylidene difluoride (PVDF).

4. The battery according to claim 1 wherein said one or more other organic solvents is selected from the group consisting of methyl ethyl carbonate (MEC), diethyl carbonate (DEC), dipropyl carbonate (DPC), dimethyl carbonate (DMC), butylene carbonate (BC), and mixtures thereof.

5. The battery according to claim 1 wherein said solvent mixture further comprises dimethyl carbonate (DMC).

6. The battery according to claim 5 wherein said solvent mixture consists of said EC, PC, and DMC in a weight ratio of 1EC:1PC:1DMC to 2EC:1PC:1DMC.

7. A battery which comprises a first electrode, a counter electrode which forms an electrochemical couple with said first electrode, and an electrolyte:
   a) said first electrode comprising graphite particles having an interlayer distance spacing of 002 planes ($d_{002}$) as determined by x-ray diffraction of 0.330 to 0.340 nanometers (nm), a crystallite size in the direction of c-axis ($L_c$) being greater than about 90 nanometers (nm) and less than about 1000 nanometers, and at least 90 percent by weight of said graphite particles having a size less than about 24 microns (µm); and
   b) said electrolyte comprising a solvent mixture and a solute; said solvent mixture comprising propylene carbonate (PC) and ethylene carbonate (EC), with the ethylene carbonate being present in an amount by weight which is at least as great as the amount of said propylene carbonate.

8. The battery according to claim 7 wherein said solvent mixture consists of EC and PC in a weight ratio of ethylene carbonate to propylene carbonate of 50EC:50PC to 75EC:25PC.

9. The battery according to claim 7 wherein said solvent mixture consists of said PC, and EC, and one or more other organic solvents different from said EC and said PC; said one or more other organic solvents having a boiling point less than the boiling point of said EC.

10. The battery according to claim 9 wherein said one or more other organic solvents is selected from the group consisting of methyl ethyl carbonate (MEC), diethyl carbonate (DEC), dipropyl carbonate (DPC), dimethyl carbonate (DMC), butylene carbonate (BC), and mixtures thereof.

11. The battery according to claim 10 wherein said ethylene carbonate is present in an amount not less than the amount by weight of said one or more other organic solvents.

12. The battery according to claim 7 wherein said electrolyte further comprises a separator in the form of a solid matrix forming a network with voids interpenetrated by said solvent mixture and said solute.

13. The battery according to claim 12 wherein said matrix is a polymeric acrylate.

14. The battery according to claim 12 wherein said matrix is porous polypropylene or porous polyethylene.

15. The battery according to claim 12 wherein said matrix is a glass fiber material.

16. The battery according to claim 7 wherein said first electrode is a negative electrode and said counter electrode is a positive electrode comprising a lithium transition metal oxide compound.

17. The battery according to claim 16 wherein said lithium transition metal oxide compound is selected from the group consisting of $LiMn_2O_4$, $LiNiO_2$, $LiCoO_2$, $LiNiVO_4$, $LiCoVO_4$, $LiCoNiO_2$, and mixtures thereof.

18. The battery according to claim 7 wherein said graphite particles have a BET surface area greater than about 4 square meters per gram ($m^2/g$) and up to about 16 meters square per gram ($m^2/g$).

19. The battery according to claim 7 wherein the crystallite size ($L_c$) is greater than about 100 nanometers (nm).

20. The battery according to claim 7 wherein the crystallite size ($L_c$) is less than about 200 nanometers (nm).

21. A battery which comprises a first electrode, a counter electrode which forms an electrochemical couple with said first electrode, and an electrolyte:
   a) said first electrode comprising graphite particles having an interlayer distance spacing of 002 planes ($d_{002}$) as determined by x-ray diffraction of 0.330 to 0.340 nanometers (nm), a crystallite size in the direction of c-axis ($L_c$) being greater than about 90 nanometers (nm) and less than about 200 nanometers (nm), a BET surface area of greater than about 4 square meters per gram ($m^2/g$) and up to about 16 square meters per gram ($m^2/g$), and at least 90 percent by weight of said graphite particles having a size less than about 16 microns (µm); and
   b) said electrolyte comprising a solute and a solvent mixture; said solute comprising a salt of a metal; said solvent mixture comprising (i) ethylene carbonate (EC), and (ii) a solvent selected from the group consisting of propylene carbonate (PC), butylene carbonate (BC), and mixtures thereof with the ethylene carbonate being present in an amount by weight which is at least as great as the amount of any other solvent.

22. The battery according to claim 21 wherein said solvent mixture consists of EC and PC in a weight ratio of ethylene carbonate to propylene carbonate of 50EC:50PC to 75EC:25PC.

23. The battery according to claim 21 wherein said solvent mixture further comprises one or more other organic solvents selected from the group consisting of methyl ethyl carbonate (MEC), diethyl carbonate (DEC), dipropyl carbonate (DPC), dimethyl carbonate (DMC), and mixtures thereof.

24. The battery according to claim 23 wherein said one or more other organic solvents consists of dimethyl carbonate (DMC).

25. The battery according to claim 24 wherein said EC, PC, and DMC are in a weight ratio of 1EC:1PC:1DMC to 2EC:1PC:1DMC.

26. The battery according to claim 21 wherein said solvent mixture consists of said EC and BC in a weight ratio of 50EC:25BC to 75EC:25BC.

27. The battery according to claim 21 wherein said electrolyte further comprises a separator in the form of a solid matrix forming a network with voids interpenetrated by said solvent and said solute.

28. The battery according to claim 21 wherein said first electrode is a negative electrode and said counter electrode is a positive electrode comprising a lithium transition metal oxide compound.

29. The battery according to claim 21 wherein said lithium transition metal is lithium manganese oxide.

30. The battery according to claim 21 wherein said EC is present in an amount by weight which is at least as great as the combined amount of any other solvents.

* * * * *